(12) United States Patent
Nakamura (10) Patent No.: US 11,193,445 B2
(45) Date of Patent: Dec. 7, 2021

(54) FUEL INJECTION CONTROL DEVICE AND METHOD FOR CONTROLLING FUEL INJECTION VALVE

(71) Applicant: DENSO CORPORATION, Kariya (JP)

(72) Inventor: Masami Nakamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/855,104

(22) Filed: Apr. 22, 2020

(65) Prior Publication Data

US 2020/0248644 A1 Aug. 6, 2020

Related U.S. Application Data

(63) Continuation of application No. PCT/JP2018/040564, filed on Oct. 31, 2018.

(30) Foreign Application Priority Data

Nov. 2, 2017 (JP) .............................. JP2017-212611

(51) Int. Cl.
  *F02D 41/40* (2006.01)
  *F02B 75/18* (2006.01)
  *F02M 55/02* (2006.01)

(52) U.S. Cl.
  CPC ............ *F02D 41/401* (2013.01); *F02B 75/18* (2013.01); *F02D 41/402* (2013.01); *F02M 55/025* (2013.01); *F02D 2200/0602* (2013.01)

(58) Field of Classification Search
  CPC ............. F02B 75/18; F02D 2200/0602; F02D 2250/04; F02D 2250/31; F02D 41/40;

(Continued)

(56) References Cited

U.S. PATENT DOCUMENTS 5,417,194 A * 5/1995 Augustin ............... F02D 41/009
                                                                  123/456
6,488,012 B1 * 12/2002 Suffredini ............... F02D 41/34
                                                                  123/458

(Continued)

FOREIGN PATENT DOCUMENTS

DE    10 2008 042 714        4/2009
EP       3 361 079           8/2018

(Continued)

*Primary Examiner* — Carl C Staubach
(74) *Attorney, Agent, or Firm* — Nixon & Vanderhye P.C.

(57) ABSTRACT

A fuel pump pressure-feeds fuel to an accumulation container that accumulates high-pressure fuel. A fuel injection valve injects high-pressure fuel accumulated in the accumulation container to an internal combustion engine. A fuel pressure sensor detects a fuel pressure in the accumulation container. A fuel pressure acquisition unit acquires the fuel pressure detected with the fuel pressure sensor. A reference computation unit computes a required injection quantity and an injection start timing based on an operation state of the internal combustion engine at a predetermined reference computation timing, which is set for each combustion cycle of the internal combustion engine, and further to compute an injection time period based on a fuel pressure acquired by the fuel pressure acquisition unit at the reference computation timing. A correction unit corrects the injection time period based on the fuel pressure acquired by the fuel pressure acquisition unit at the injection start timing.

10 Claims, 8 Drawing Sheets

(58) Field of Classification Search
CPC ... F02D 41/401; F02D 41/402; F02M 55/025; Y02T 10/40
See application file for complete search history.

(56) References Cited

U.S. PATENT DOCUMENTS

| | | | |
|---|---|---|---|
| 2006/0266327 A1* | 11/2006 | Fukasawa | F02D 41/3845 123/305 |
| 2009/0326788 A1* | 12/2009 | Yuasa | F02D 41/3809 701/104 |
| 2013/0268180 A1* | 10/2013 | Gottschalk | F02D 41/402 701/111 |
| 2017/0363036 A1* | 12/2017 | Okamoto | F02D 41/402 |
| 2018/0230931 A1 | 8/2018 | Imai et al. | |
| 2019/0178197 A1* | 6/2019 | Okamura | F02D 41/3082 |

FOREIGN PATENT DOCUMENTS

| | | |
|---|---|---|
| FR | 2 859 763 | 3/2005 |
| GB | 2 326 742 | 12/1998 |
| JP | 6-93915 | 4/1994 |
| JP | 11-036935 | 2/1999 |
| JP | 2010-043614 | 2/2010 |

* cited by examiner

FUEL INJECTION CONTROL DEVICE AND METHOD FOR CONTROLLING FUEL INJECTION VALVE

CROSS REFERENCE TO RELATED APPLICATION

The present application is a continuation application of International Patent Application No. PCT/JP2018/040564 filed on Oct. 31, 2018, which designated the U.S. and claims the benefit of priority from Japanese Patent Application No. 2017-212611 filed on Nov. 2, 2017. The entire disclosures of all of the above applications are incorporated herein by reference.

TECHNICAL FIELD

The present disclosure relates to a fuel injection control device for a fuel injection system that injects fuel using high-pressure fuel accumulated in an accumulation container. The present disclosure relates to a method for controlling a fuel injection valve.

BACKGROUND

For example, in an internal combustion engine of a gasoline direct injection type, high-pressure fuel accumulated in an accumulation container is injected from a fuel injection valve into the internal combustion engine.

SUMMARY

According to one aspect of the present disclosure, a fuel injection control device is for a fuel injection system, which includes an accumulation container configured to accumulate high-pressure fuel, a fuel pump configured to pressure-feed fuel to the accumulation container, a fuel injection valve configured to inject high-pressure fuel accumulated in the accumulation container into a cylinder of an internal combustion engine, and the fuel pressure sensor configured to detect a fuel pressure in the accumulation container. The fuel injection control device comprises a fuel pressure acquisition unit configured to acquire the fuel pressure detected with the fuel pressure sensor. The fuel injection control device further comprises an injection control unit configured to control fuel injection with the fuel injection valve.

BRIEF DESCRIPTION OF THE DRAWINGS

The above and other objects, features and advantages of the present disclosure will become more apparent from the following detailed description made with reference to the accompanying drawings. In the drawings:

FIG. 8 is a timing chart illustrating how a reference fuel pressure difference $\Delta P1$ is referenced to; and FIG. 9 is a timing chart illustrating how the reference fuel pressure difference $\Delta P1$ is referenced to.

DETAILED DESCRIPTION

As follows, examples of the present disclosure will be described.

According to an example, an internal combustion engine of a gasoline direct injection type includes a fuel injection valve to inject high-pressure fuel, which is accumulated in an accumulation container, into the internal combustion engine. In this configuration, an injection rate at the time of fuel injection depends on a fuel pressure in the accumulation container. Therefore, the fuel pressure is detected with a pressure sensor provided in the accumulation container and an injection condition is adjusted based on the detected fuel pressure.

In an example, a pressure sensor is installed to detect a discharge pressure of a fuel pump. In addition, a fuel injection time period of a fuel injection valve is corrected based on a difference between a target fuel pressure that is set according to an operation state of an internal combustion engine that is a destination of fuel supply and the actual fuel pressure detected with the pressure sensor.

In an assumable fuel injection control, an injection quantity and an injection start timing may be computed before fuel injection is performed with a fuel injection valve. In this assumable control, when fuel is pressure-fed by a fuel pump in a period, for example, after an injection quantity is computed before fuel injection is actually performed, an error may arise between a required injection quantity and an actual injection quantity. Therefore, in this assumable control, an error in injection quantity may arise when the fuel pressure varies after fuel is discharged from the fuel pump before fuel injection with the fuel injection valve.

According to one example, a fuel injection control device is for a fuel injection system, which includes an accumulation container configured to accumulate high-pressure fuel, a fuel pump configured to pressure-feed fuel to the accumulation container, a fuel injection valve configured to inject high-pressure fuel accumulated in the accumulation container into a cylinder of an internal combustion engine, and the fuel pressure sensor configured to detect a fuel pressure in the accumulation container. The fuel injection control device comprises a fuel pressure acquisition unit configured to acquire the fuel pressure detected with the fuel pressure sensor. The fuel injection control device further comprises an injection control unit configured to control fuel injection with the fuel injection valve. The injection control unit includes a reference computation unit configured to compute a required injection quantity and an injection start timing based on an operation state of the internal combustion engine at a predetermined reference computation timing, which is set for each combustion cycle of the internal combustion engine, and further to compute an injection time period based on the fuel pressure acquired by the fuel pressure acquisition unit at the reference computation timing. The injection control unit further includes a correction unit configured to correct the injection time period based on the fuel pressure acquired by the fuel pressure acquisition unit at the injection start timing.

According to this example, the injection start timing and the injection time period are first set by the reference computation unit and thereafter the injection time period is corrected by the correction unit based on the fuel pressure actually measured at the injection start timing. Therefore, start of injection at an appropriate timing and accurate control of the fuel injection quantity using the fuel pressure actually measured at the injection start timing can be both achieved.

In the drawings referenced to in relation to the description of the following embodiments, identical or equivalent items will be marked with identical reference numerals and with respect to more than one identical or equivalent item, a description of one item will be cited in a description of other items.

First Embodiment

Figure 1:
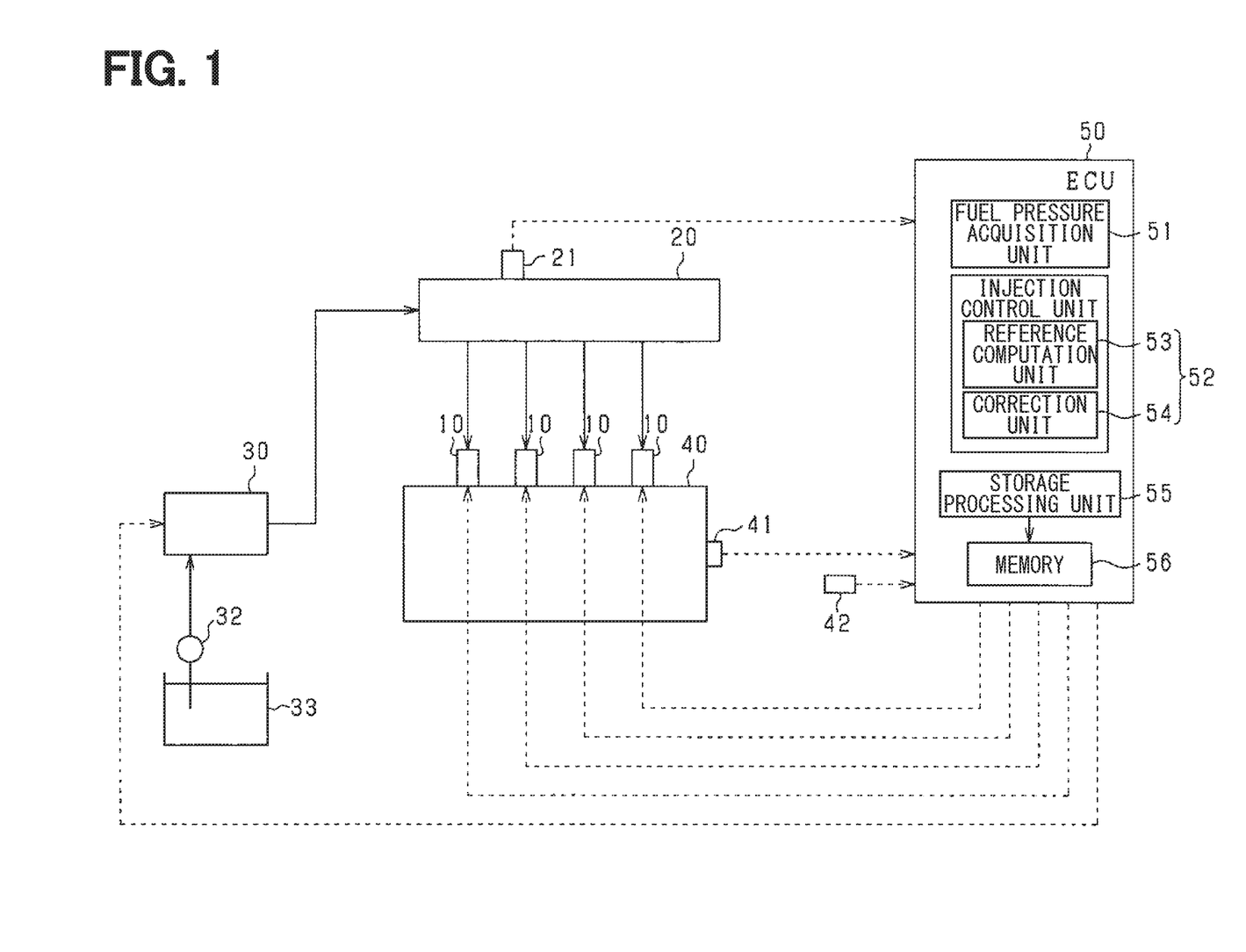
FIG. 1 is a block diagram illustrating a fuel injection control device in an embodiment and a fuel injection system and an internal combustion engine controlled by the fuel injection control device.

As illustrated in FIG. 1, a fuel injection control device in this embodiment is a control device that controls a fuel injection system 1 for an internal combustion engine 40 that is a direct injection type 4-cylinder gasoline engine (multi-cylinder internal combustion engine). The fuel injection system 1 is an accumulator fuel injection system accumulating high-pressure fuel and includes: a fuel tank 33; a feed pump 32; a high-pressure fuel pump 30; an accumulation container 20; a fuel injection valve 10; and various sensors including a fuel pressure sensor 21.

The feed pump 32 draws fuel from the fuel tank 33 and supplies the fuel to the high-pressure fuel pump 30. The high-pressure fuel pump 30 pressure-feeds fuel supplied from the fuel tank 33 by the feed pump 32 to the accumulation container 20. The high-pressure fuel pump 30 draws and pressurizes fuel by using a plunger that reciprocates in a housing in conjunction with a crank shaft of the internal combustion engine 40 and supplies the fuel to the accumulation container 20. The high-pressure fuel pump 30 discharges fuel, for example, twice in one turn of the crank shaft.

The accumulation container 20 accumulates and holds fuel supplied from the high-pressure fuel pump 30. In the accumulation container 20, the fuel pressure sensor 21 is installed, and the fuel pressure sensor 21 detects a fuel pressure (actual pressure) in the accumulation container 20.

The fuel injection valve 10 in a number equivalent to a number of cylinders is connected via a fuel line to the accumulation container 20. The fuel injection valves 10 inject fuel accumulated and held in the accumulation container 20 into respective cylinders. Each fuel injection valve 10 is a publicly known electromagnetically driven or piezo-electrically driven valve that opens and closes a nozzle needle by controlling the fuel pressure in a control chamber applying pressure to the nozzle needle in a valve closing direction. An injection quantity of injected fuel is increased with increase in valve opening period of the fuel injection valve 10.

In the internal combustion engine 40, the fuel injection valve 10 provided for each of the four cylinders performs fuel injection at a 180° CA cycle in predetermined order. Meanwhile, the high-pressure fuel pump 30 also performs fuel discharge at the same 180° CA cycle. That is, fuel injection of the fuel injection valves 10 and fuel discharge of the high-pressure fuel pump 30 are synchronized with each other, and the fuel injection valve 10 of each cylinder is identical in periodical relation of fuel injection with fuel discharge by the high-pressure fuel pump 30.

ECU 50 is an electronic control device including a microcomputer or the like including CPU, such memory as ROM and RAM, an I/O device, and the like, and the fuel injection control device includes the ECU 50. The ECU 50 is inputted with detection signals from a revolution speed sensor 41 that detects an engine revolution speed and detection signals from an air quantity sensor 42 that detects an intake air quantity as an engine load in addition to detection signals from the above-mentioned fuel pressure sensor 21. The ECU 50 executes a program stored in ROM to control driving of the fuel injection valves 10 and the high-pressure fuel pump 30. The ECU 50 sets a target fuel pressure based on an engine operation state including the engine revolution speed, the engine load, and the like and further feedback-controls a quantity of fuel discharge by the high-pressure fuel pump 30 based on a difference between a target fuel pressure and an actual fuel pressure detected with the fuel pressure sensor 21.

The ECU 50 has, as functions related to fuel injection control, a fuel pressure acquisition unit 51 that acquires the fuel pressure detected with the fuel pressure sensor 21 and an injection control unit 52 that controls fuel injection with the fuel injection valve 10 of each cylinder. The injection control unit 52 includes a reference computation unit 53. The reference computation unit 53 computes a required injection quantity and an injection start timing based on an engine operation state including the engine revolution speed, the engine load, and the like at a predetermined reference computation timing that is set for each combustion cycle of the internal combustion engine 40. The reference computation unit further computes an injection time period Ti that is an energization time for each fuel injection valve 10, or a duration of an injection pulse, based on the fuel pressure Pa acquired by the fuel pressure acquisition unit 51 at the reference computation timing.

In fuel injection, for example, 600° CA before compression TDC for each cylinder is taken as a reference computation timing to compute the required injection quantity, the injection start timing, and the injection time period Ti. The fuel pressure can be varied due to fuel discharge of the high-pressure fuel pump 30 or the like during a period from the reference computation timing to the injection start time. An error in injection quantity due to such a variation in fuel pressure is apprehended.

Issues due to an error in injection quantity are considered to be remarkable in a so-called minute injection region. In an ordinary region (region larger in injection quantity than a minute injection region), so-called full lift injection is performed in which injection is performed with a valve body provided in the fuel injection valve 10 having arrived at a maximum lift amount; and in a minute injection region, partial lift injection is performed in which injection is performed with the valve body having not arrived at the maximum lift amount.

Figure 2:
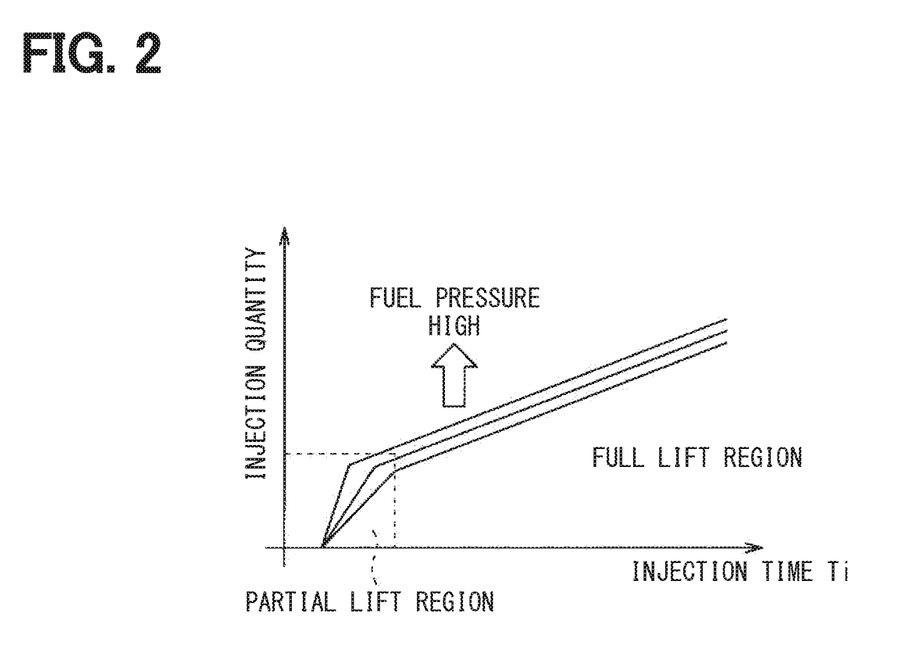
FIG. 2 is a diagram illustrating a relationship between injection quantity and injection time period.

That is, as shown in FIG. 2, in a minute injection region (partial lift region), an amount of change in injection quantity Q against in an amount of change in injection time period Ti is increased as compared with an ordinary region. In a minute injection region, an amount of change in injection quantity Q against an amount of change in injection time period Ti is increased with increase in fuel pressure. That is, in a minute injection region, an amount of deviation in injection quantity against an amount of deviation in injection time period Ti increases as compared with an ordinary region and further an amount of deviation in injection quantity Q tends to increase with increase in fuel pressure.

In this embodiment, the injection control unit 52 includes a correction unit 54. The correction unit 54 corrects the injection time period Ti based on the fuel pressure Pb acquired by the fuel pressure acquisition unit 51 at the injection start time behind the reference computation timing. In this case, at the reference computation timing as an injection quantity computation time, the fuel pressure Pa at that reference computation timing is reflected, and the required injection quantity is converted on a time basis, and the injection time period Ti of the fuel injection valve 10 is thereby computed. Thereafter, the injection time period Ti is corrected based on the fuel pressure Pb at the injection start timing.

When the injection time period Ti is corrected based on the fuel pressure Pb at the injection start timing, the correction may not be completed before an end of fuel injection (a falling edge of an injection pulse) of this time. For example, when the injection time period Ti is slightly shorter, a correction time cannot be ensured, and correction may not be completed before the end of the injection time period Ti.

In this embodiment, consequently, the ECU 50 is provided with a storage processing unit 55, and the storage processing unit 55 computes, as a reference fuel pressure difference ΔP1, a difference between the fuel pressure Pa acquired at the reference computation timing and the fuel pressure Pb acquired at the injection start timing and stores the reference fuel pressure difference ΔP1 in a memory 56. The memory 56 is a storage unit including, for example, RAM. When the reference fuel pressure difference ΔP1 is stored in the memory 56, the reference computation unit 53 computes the injection time period Ti based on the fuel pressure Pa acquired at the reference computation timing and the reference fuel pressure difference ΔP1. This is equivalent to that at the reference computation timing, the fuel pressure at the injection start timing is estimated and a result of this estimation is reflected to compute the injection time period Ti. In this case, even when correction of the injection time period Ti has not been completed after start of injection, a value closer to the fuel pressure Pb at the injection start timing of the present cycle can be used to compute the injection time period.

Figure 3:
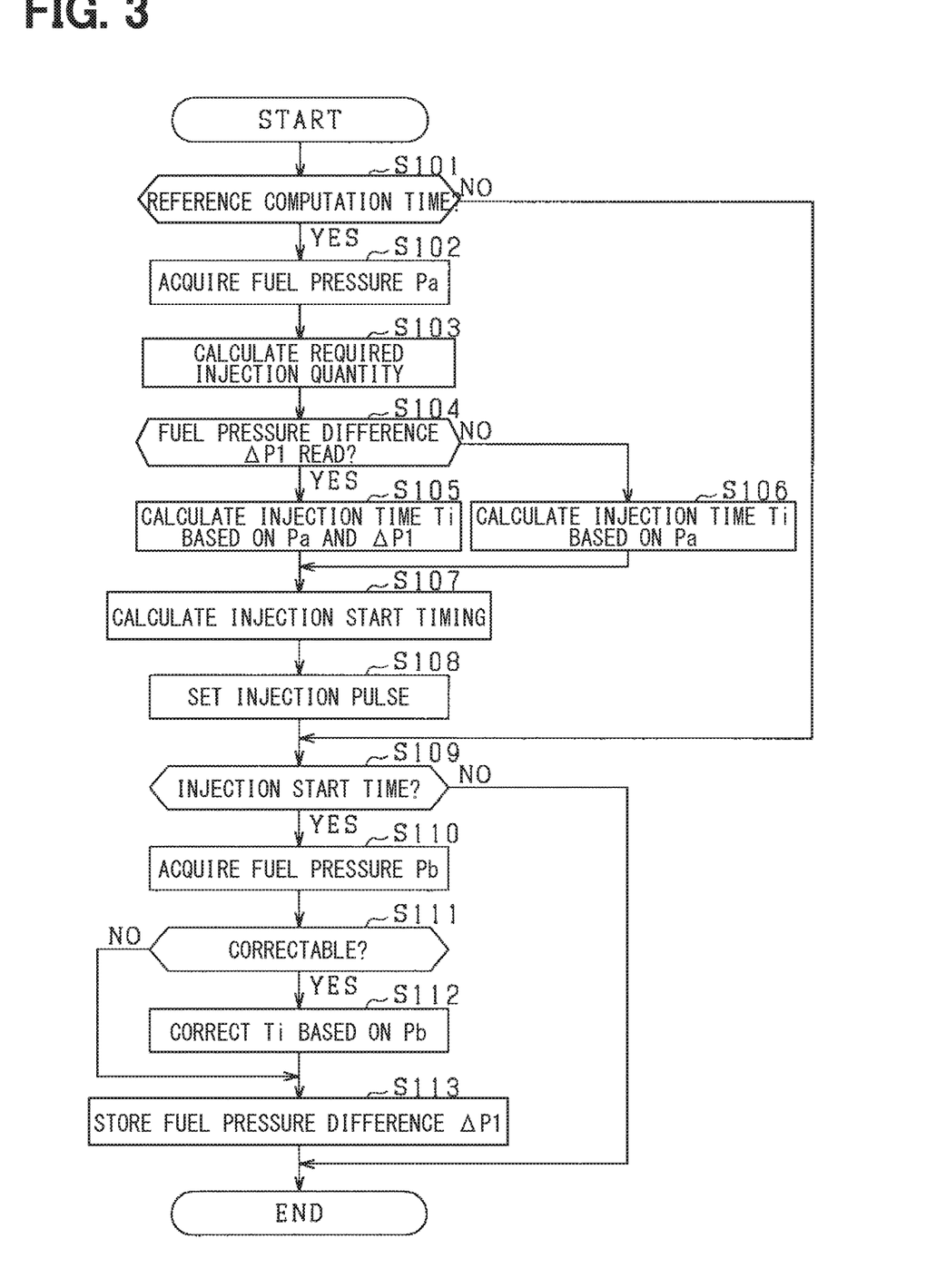
FIG. 3 is a flowchart of fuel injection control processing performed by ECU.

FIG. 3 is a flowchart showing the fuel injection control processing performed by the ECU 50. This processing is repeatedly performed by the ECU 50 at predetermined intervals.

At Step S101, first, whether the present time is the reference computation timing or not is determined. The reference computation timing is set as a predetermined timing (for example, 600° CA before compression TDC) for each combustion cycle of each cylinder. When the present time is the reference computation timing, the operation proceeds to Step S102 and when the present time is not the reference computation timing, the operation proceeds to Step S109. At Step S102, the fuel pressure detected with the fuel pressure sensor 21 is acquired as the fuel pressure Pa.

At Step S103, the required injection quantity is computed based on the engine revolution speed and the engine load.

At Step S104, subsequently, whether the reference fuel pressure difference ΔP1 stored in the memory 56 is to be read or not is determined. When the reference fuel pressure difference ΔP1 is stored in the memory 56 at this time and the reference fuel pressure difference ΔP1 is computed in the preceding combustion cycle, a conclusion that the reference fuel pressure difference ΔP1 can be read is made. An affirmative determination is made at Step S104 and the operation proceeds to Step S105. When the reference fuel pressure difference ΔP1 is not stored in the memory 56 or when the reference fuel pressure difference ΔP1 is stored but is not computed in the preceding combustion cycle, a conclusion that the reference fuel pressure difference ΔP1 cannot be read is made. A negative determination is made at Step S104 and the operation proceeds to Step S106. At Step S104, it is advisable to determine whether the reference fuel pressure difference ΔP1 computed in the preceding combustion cycle is stored in the memory 56 with respect to an identical fuel injection valve 10.

At Step S105, the injection time period Ti is computed based on a result of conversion of the required injection quantity into a time period, the fuel pressure Pa, and the reference fuel pressure difference ΔP1. At this time, an addition value (Pa+ΔP1) of the fuel pressure Pa and the reference fuel pressure difference ΔP1 is used to compute the injection time period Ti. At Step S106, the injection time period Ti is computed based on a result of conversion of the required injection quantity into the time period and the fuel pressure Pa.

At Step S107, subsequently, the injection start timing is computed based on the engine revolution speed and the engine load. At Step S108, an injection pulse set according to the injection time period Ti is set on an output circuit. As a result, an injection pulse is generated at desired the injection start timing. Thereafter, the injection pulse is caused to fall when the injection time period Ti has passed.

At Step S109, whether the present time is the injection start time or not is determined. When the present time is the injection start time, the operation proceeds to Step S110, and when the present time is not the injection start time, the present processing is once terminated. At Step S110, the fuel pressure detected with the fuel pressure sensor 21 is acquired as the fuel pressure Pb. The fuel pressure Pb may be the fuel pressure detected before the fuel pressure is reduced from that at start of fuel injection at the injection start time or immediately before the injection start time.

At Step S111, subsequently, whether the injection time period Ti can be corrected based on the fuel pressure Pb within the present injection time period Ti or not is determined. When the injection time period is correctable, the operation proceeds to Step S112; and when the injection time period is uncorrectable, the operation proceeds to Step S113 with Step S112 skipped. At this time, it is advisable to determine correctability according to a length of the injection time period Ti. For example, when the injection time period Ti is smaller than a predetermined value, a conclusion that a time period required for the correction processing is insufficient is made and a determination of uncorrectable is made.

At Step S112, the injection time period Ti is corrected based on the fuel pressure Pb. At this time, correction may be made by replacement with the injection time period Ti computed based on the fuel pressure Pb or may be made using an amount of change in injection time period Ti computed based on the reference fuel pressure difference ΔP1 that is a difference between the fuel pressure Pa at the reference computation timing and the fuel pressure Pb at the injection start timing. For example, when Pa<Pb is satisfied, an actual injection rate is greater than an injection rate assumed at the reference computation timing; therefore, an injection end timing (timing of a falling edge of an injection pulse) is corrected to the advance angle side to shorten the injection time period Ti.

When the injection time period Ti is computed by reflecting the reference fuel pressure difference ΔP1 in the memory 56 at the reference computation timing (Step S105), it is advisable to correct the injection time period Ti based on an amount equivalent to a difference between the reference fuel pressure difference ΔP1 in the memory 56 and the present reference fuel pressure difference ΔP1. The operation of Step S111 may be omitted. For example, in cases where the operation of Step S111 is not performed and where the injection time period Ti is corrected based on the fuel pressure Pb, injection is terminated based on the corrected injection time period Ti when the correction is not too late and injection is terminated based on the injection time period Ti before correction when the correction is too late.

At Step S113, subsequently, the reference fuel pressure difference ΔP1 (=Pb−Pa) in the present cycle is stored in the memory 56 and thereafter, the present processing is terminated.

Figure 4:
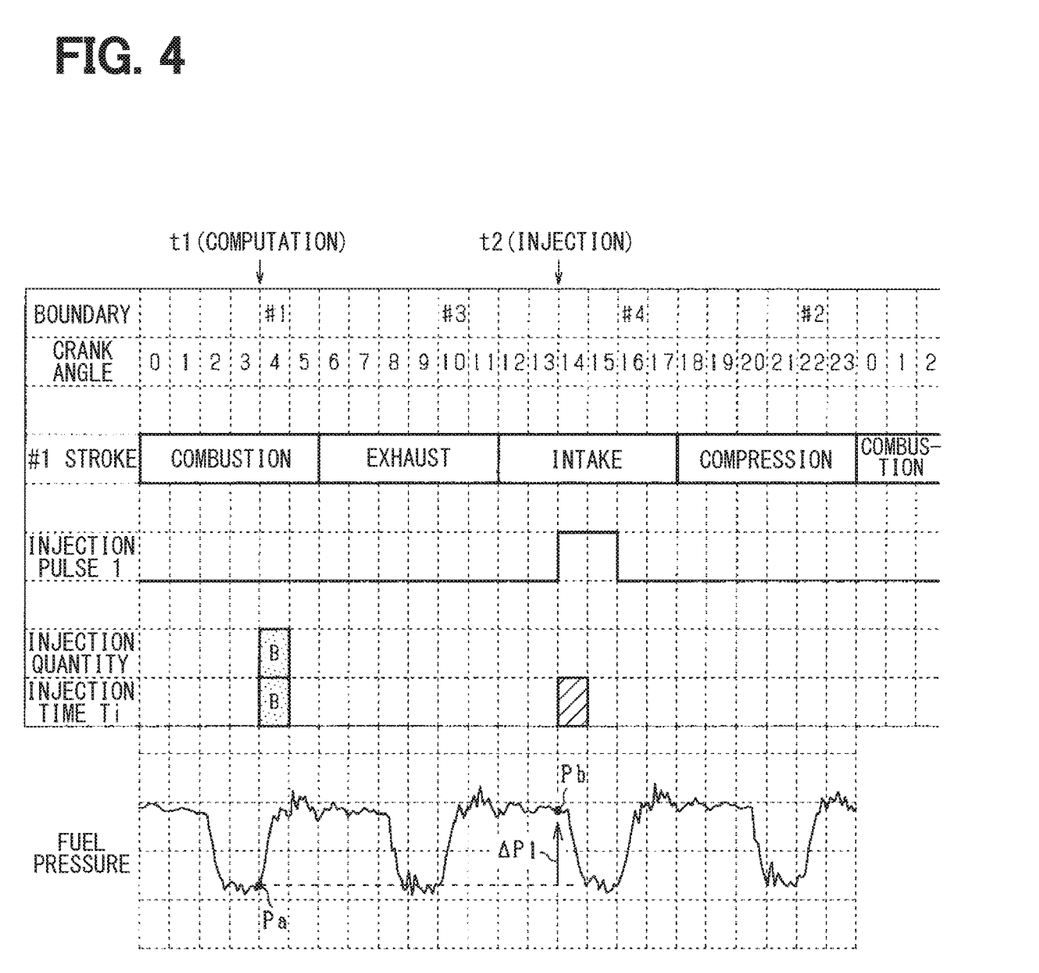
FIG. 4 is a timing chart concretely illustrating fuel injection control.

FIG. 4 is a timing chart illustrating fuel injection performed in a predetermined cylinder (first cylinder) of the internal combustion engine 40. In FIG. 4, boundaries and crank angle value of first to fourth cylinders are indicated and further strokes of the first cylinder, an injection pulse, a timing of required injection quantity computation, and a timing of injection time period Ti computation. Variation in fuel pressure is also shown. The crank angle value is given as numbers of 0 to 23, for example, for each 30° CA within a period during which the crank shaft is turned twice (within 720° CA). In FIG. 4, a timing of required injection quantity computation and a timing of injection time period Ti computation are shown in positions corresponding to crank angle value for convenience in explanation.

In FIG. 4, the fuel pressure repeatedly increases and decreases. That is, the fuel pressure increases at a timing corresponding to fuel discharge of the high-pressure fuel pump 30 and the fuel pressure decreases at a timing corresponding to fuel injection of each fuel injection valve 10.

Time t1 is a reference injection time period and at time t1, the fuel pressure Pa is acquired, and further the required injection quantity and the injection time period Ti are computed. At an intake stroke, a timing corresponding to crank angle value=14 is computed as the injection start timing.

Time t2 is an the injection start timing and at time t2, the fuel pressure Pb is acquired, and the injection time period Ti is corrected based on the acquired fuel pressure Pb. During a period from time t1 to time t2, the fuel pressure increases twice due to fuel discharge of the high-pressure fuel pump 30 and further the fuel pressure decreases once due to fuel injection of another cylinder (specifically, second cylinder). For this reason, a difference is produced between the fuel pressures Pa and Pb but the injection time period Ti is corrected according to the difference in fuel pressure.

For example, when the injection time period Ti is relatively short, correction based on the fuel pressure Pb may not be completed. For this reason, at time t2 as the injection start time, the reference fuel pressure difference ΔP1 that is a difference between the fuel pressure Pa at the reference computation timing and the fuel pressure Pb at the injection start timing is stored in the memory 56, and at the next reference injection time period (equivalent to time t1), the injection time period Ti is computed based on the fuel pressure Pa and the reference fuel pressure difference ΔP1. Thus, Ti correction based on the fuel pressure Pb can be made by estimation even though Ti correction based on the fuel pressure Pb cannot be made after start of subsequent injection.

According to this embodiment described in detail up to this point, the following excellent effects are brought about:

The Injection start timing and the injection time period Ti are first set by the reference computation unit 53 and thereafter, the injection time period Ti is corrected by the correction unit 54 based on the fuel pressure Pb actually measured at the injection start timing. For this reason, start of injection at an appropriate timing and accurate control of a fuel injection quantity using the fuel pressure actually measured at the injection start timing can be both achieved.

Especially, for fuel injection in a minute injection region (partial lift region), an amount of deviation in injection quantity Q can be larger against an amount of deviation in injection time period Ti. The above embodiment may be effective especially in such fuel injection in a minute injection region.

When the injection time period Ti is corrected based on the fuel pressure Pb at the injection start timing, the correction may not be completed before an end of fuel injection (a falling edge of an injection pulse) of this time. In this embodiment, a difference between the fuel pressure Pa acquired at the reference computation timing and the fuel pressure Pb acquired at the injection start timing is stored as the reference fuel pressure difference ΔP1 in the memory 56; and at the next reference computation timing, the injection time period Ti is computed based on the fuel pressure Pa at that time and the reference fuel pressure difference ΔP1 stored in the memory 56. As a result, accuracy of fuel injection can be securely optimized even though correction of the injection time period Ti is not completed.

To compute the injection time period Ti at the reference computation timing, the reference fuel pressure difference ΔP1 computed in the preceding combustion cycle of an identical fuel injection valve 10 is used as the reference fuel pressure difference ΔP1. The reference fuel pressure difference ΔP1 computed in the preceding combustion cycle of an identical fuel injection valve 10 can be considered to have no difference or little difference from the reference fuel pressure difference ΔP1 of the present time. For this reason, appropriate fuel injection can be performed regardless of transient variation in fuel pressure.

Second Embodiment

A description will be given to the second embodiment with particular emphasis on a difference from the above-mentioned first embodiment. In this embodiment, the ECU 50 is capable of performing more than one time of fuel injection in one combustion cycle of the internal combustion engine 40 as split injection. Split injection is performed in such a pattern as 2-stage injection, 3-stage injection, 4-stage injection, or the like. For example, when 3-stage injection is performed as split injection, fuel injection can be performed twice in an intake stroke and once in a compression stroke.

When split injection is performed, the fuel injection valves 10 of different cylinders can overlap in fuel injection period. Further, a fuel injection period and the fuel pressure-feed period of the high-pressure fuel pump 30 can overlap with each other. For this reason, to grasp (estimate) the fuel pressure in injection in each stage of multi-stage injection at the reference computation timing, it is desirable to consider an amount of fuel pressure drop caused in each injection in addition to an amount of change from the fuel pressure at the reference computation timing.

Consequently, in this embodiment, in addition to computing the above-mentioned reference fuel pressure difference ΔP1 and storing the reference fuel pressure difference in the memory 56, the storage processing unit 55 in the ECU 50 computes, as a before-after-injection fuel pressure difference ΔP2, the fuel pressure difference between before fuel injection and after fuel injection for each injection of split injection and stores the computed fuel pressure difference in the memory 56. Further, the reference computation unit 53 computes the injection time period Ti based on the fuel pressure Pa acquired by the fuel pressure acquisition unit 51 at the reference computation timing, the reference fuel pressure difference ΔP1, and the before-after-injection fuel pressure difference ΔP2 stored in the memory 56.

With respect to computation of the before-after-injection fuel pressure difference ΔP2, it is advisable to cause the storage processing unit 55 to compute, as the before-after-injection fuel pressure difference ΔP2, a difference between the fuel pressure acquired by the fuel pressure acquisition unit 51 at the injection start timing of each injection of split injection and the fuel pressure acquired by the fuel pressure acquisition unit 51 at the injection start timing of the subsequent injection.

For example, when 3-stage split injection is performed, the storage processing unit 55 computes before-after-injection fuel pressure differences ΔP21, ΔP22 between before fuel injection and after fuel injection with respect to first-stage injection and second-stage injection. That is, a difference between the fuel pressure Pb1 acquired at the injection start timing of the first-stage injection and the fuel pressure Pb2 acquired at the injection start timing of the second-stage injection is computed as the fuel pressure difference ΔP21 between before and after the first-stage injection; and a difference between the fuel pressure Pb2 acquired at the injection start timing of the second-stage injection and the fuel pressure Pb3 acquired at the injection start timing of the third-stage injection is computed as the fuel pressure difference ΔP22 between before and after the second-stage injection.

Figure 5:
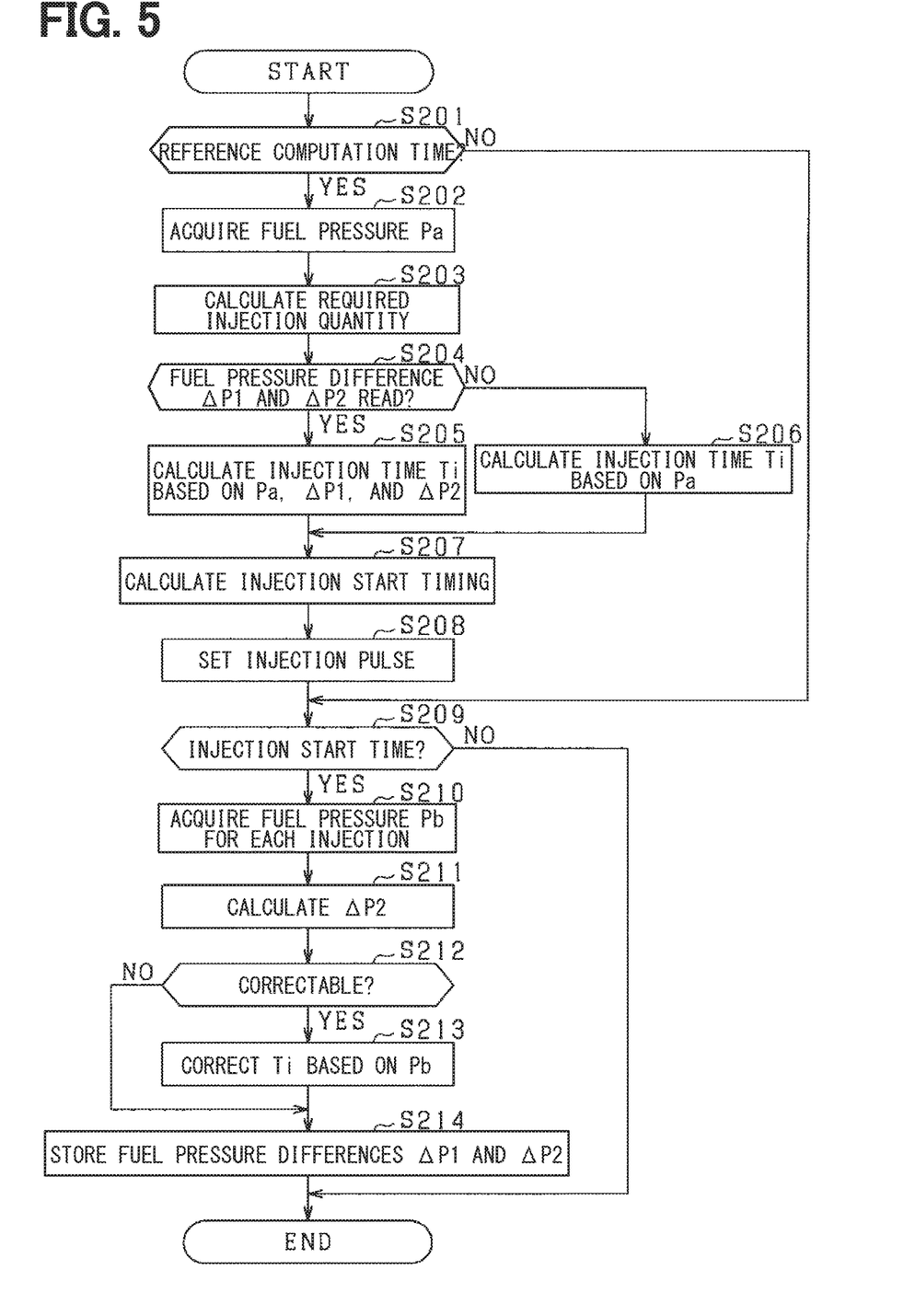
FIG. 5 is a flowchart of fuel injection control processing in a second embodiment.

FIG. 5 is a flowchart of fuel injection control processing in this embodiment. This processing is on the assumption of 3-stage split injection and is repeatedly performed at predetermined intervals by the ECU 50 when the 3-stage split injection is performed. FIG. 5 is drawn by partly modifying FIG. 3 and a description of the same operation as in FIG. 3 will be simplified.

At Steps S201 to S203 in FIG. 5, the fuel pressure detected with the fuel pressure sensor 21 is acquired as the fuel pressure Pa on condition that the present time is the reference computation timing and further, the required injection quantity is computed (same as Steps S101 to S103 in FIG. 3). Especially in split injection, at Step S203, the required injection quantity is split to compute an injection quantity of each stage.

At Step S204, subsequently, whether the reference fuel pressure difference ΔP1 and the before-after-injection fuel pressure differences ΔP21, ΔP22 stored in the memory 56 are to be read or not is determined. When the reference fuel pressure difference ΔP1 and the before-after-injection fuel pressure differences ΔP21, ΔP22 are stored in the memory 56 at this time and these differences are computed in the preceding combustion cycle, a conclusion that the reference fuel pressure difference ΔP1 and the before-after-injection fuel pressure differences ΔP21, ΔP22 can be read is made. An affirmative determination is made at Step S204 and the operation proceeds to Step S205. When the reference fuel pressure difference ΔP1 or the before-after-injection fuel pressure differences ΔP21, ΔP22 are not stored in the memory 56 or when the reference fuel pressure difference ΔP1 and the before-after-injection fuel pressure differences ΔP21, ΔP22 are stored but these differences are not computed in the preceding combustion cycle, a negative determination is made at Step S204 and the operation proceeds to Step S206. At Step S204, it is advisable to determine whether the reference fuel pressure difference ΔP1 and the before-after-injection fuel pressure differences ΔP21, ΔP22 computed in the preceding combustion cycle with respect to an identical fuel injection valve 10 are stored in the memory 56 or not.

At Step S205, the injection time period Ti1, Ti2, Ti3 of each injection is computed based on a result of conversion of the required injection quantity into the time period, the fuel pressure Pa, the reference fuel pressure difference ΔP1, and the before-after-injection fuel pressures ΔP21, ΔP22. At this time, the injection time period Ti1 of first-stage injection is computed as an addition value (Pa+ΔP1) of the fuel pressure Pa and the reference fuel pressure difference ΔP1. The injection time period Ti2 of second-stage injection is computed as an addition value (Pa+ΔP1+ΔP21) of the fuel pressure Pa, the reference fuel pressure difference ΔP1, and the before-after-injection fuel pressure difference ΔP21. The injection time period Ti3 of third-stage injection is computed as an addition value (Pa+ΔP1+ΔP21+ΔP22) of the fuel pressure Pa, the reference fuel pressure difference ΔP1, and the before-after-injection fuel pressure differences ΔP21, ΔP22. At Step S206, the injection time period Ti is computed based on a result of conversion of the required injection quantity into the time period and the fuel pressure Pa (same as Step S106 in FIG. 3).

At Steps S207 and S208, subsequently, the injection start timing is computed and an injection pulse is set on an output circuit (same as Steps S107 and S108 in FIG. 3).

At Step S209, whether the present time is any injection start time of each injection of multi-stage injection or not is determined. When the present time is any injection start time, the operation proceeds to Step S210; and when the present time is not any injection start time, the present processing is once terminated.

At Step S210, the fuel pressure detected with the fuel pressure sensor 21 is acquired as the fuel pressure Pb for each injection. At this time, in the case of first-stage injection, the fuel pressure Pb1 is acquired; in the case of second-stage injection, the fuel pressure Pb2 is acquired; and in the case of third-stage injection, the fuel pressure Pb3 is acquired. At Step S211, the before-after-injection fuel pressure difference ΔP2 is computed. At this time, the fuel pressure difference ΔP21 between before and after first-stage injection is computed by "Pb2−Pb1," and the fuel pressure difference ΔP22 between before and after second-stage injection is computed by "Pb3−Pb2."

At Step S212, subsequently, whether the injection time period Ti can be corrected based on the fuel pressure Pb or not is determined with respect to the present injection. When the injection time period is correctable, the operation proceeds to Step S213; and when the injection time period is uncorrectable, the operation proceeds to Step S214 with Step S213 skipped. Like Step S111, Step S212 can also be omitted.

At Step S213, the injection time period Ti is corrected based on the fuel pressure Pb. At this time, with respect to first-stage injection, the injection time period Ti1 is corrected based on the fuel pressure Pb1; with respect to second-stage injection, the injection time period Ti2 is corrected based on the fuel pressure Pb2; and with respect to third-stage injection, the injection time period Ti3 is corrected based on the fuel pressure Pb3. As at Step S112, correction may be made by replacement with the injection time period Ti computed based on the fuel pressure Pb or may be made using an amount of change in injection time period Ti computed based on the reference fuel pressure difference ΔP1 and the like.

At Step S214, subsequently, the reference fuel pressure difference ΔP1 and the before-after-injection fuel pressure difference ΔP2 are stored in the memory 56 and thereafter, the present processing is terminated.

Figure 6:
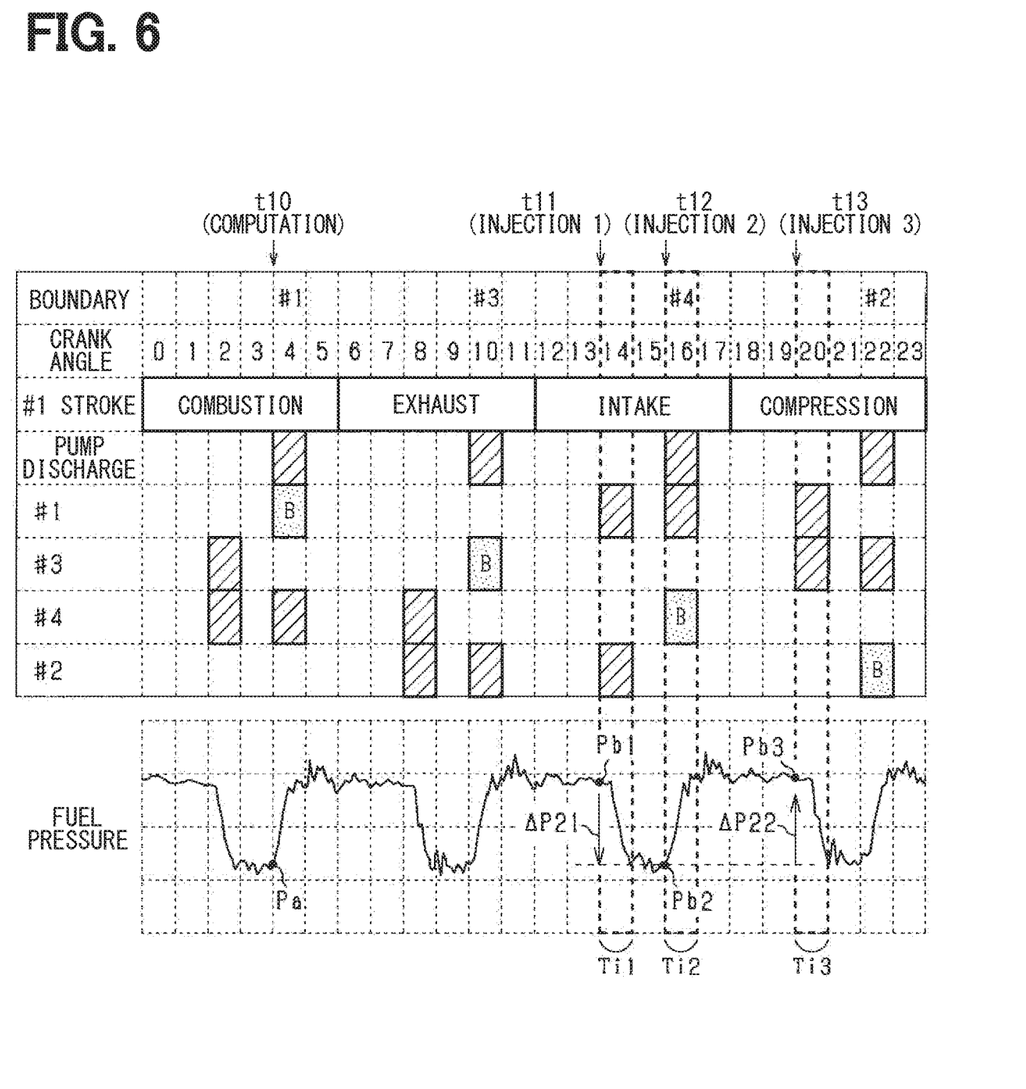
FIG. 6 is a timing chart concretely illustrating fuel injection control in the second embodiment.

A concrete description will be given to how the injection time period Ti is corrected when split injection is performed with reference to the timing chart in FIG. 6. In FIG. 6, a discharge period of the high-pressure fuel pump 30 and a fuel injection period of the fuel injection valve 10 of each cylinder are indicated in accordance with crank angle value.

In multi-stage injection, fuel injection is dispersedly performed during a period from initial-stage fuel injection to last-stage fuel injection; therefore, overlapping with a pump discharge period and overlapping with fuel injection of any other cylinder are prone to occur. For example, at crank angle value=4, pump discharge and fuel injection of a fourth cylinder overlap with each other and at crank angle value=10, pump discharge and fuel injection of a second cylinder overlap with each other. At crank angle value=2, fuel injection of a third cylinder and fuel injection of the fourth cylinder overlap with each other; and at crank angle value=8, fuel injection of the fourth cylinder and fuel injection of the second cylinder overlap with each other. For this reason, variation in fuel pressure is complicated. That is, variation in fuel pressure may be caused by any other factor than fuel injection of a relevant cylinder.

In FIG. 6, as split injection of the first cylinder, two times of intake stroke injection (injections 1 and 2 shown in FIG. 6) are performed as first-stage injection and second-stage injection; and one time of compression stroke injection (INJECTION 3 shown in FIG. 6) is performed as third-stage injection.

In FIG. 6, time t10 is a reference injection time period and at time t10, the fuel pressure Pa is acquired and the required injection quantity, an injection quantity of each stage, and the injection time period Ti of each stage are computed. In an intake stroke, a timing corresponding to crank angle value=14, 16 is computed as the injection start timing of first-stage injection and second-stage injection; and in a compression stroke, a timing corresponding to crank angle value=20 is computed as the injection start timing of third-stage injection.

At time t11 as the injection start time of first-stage injection, thereafter, the fuel pressure Pb1 is acquired and the injection time period Ti1 of first-stage injection is corrected based on the fuel pressure Pb1 (reference fuel pressure difference ΔP1 when an amount of change in injection time period Ti is used). At time t11, further, the reference fuel pressure difference ΔP1 is stored in the memory 56.

At time t12 as the injection start time of second-stage injection, thereafter, the fuel pressure Pb2 is acquired and the injection time period Ti2 of second-stage injection is corrected based on the fuel pressure Pb2 (the reference fuel pressure difference ΔP1 and the before-after-injection fuel pressure difference ΔP21 when an amount of change in injection time period Ti is used). At time t12, further, the fuel pressure difference ΔP21 between before and after first-stage injection is stored in the memory 56.

At time t13 as the injection start time of third-stage injection, further, the fuel pressure Pb3 is acquired and the injection time period Ti3 of third-stage injection is corrected based on the fuel pressure Pb3 (the reference fuel pressure difference ΔP1 and the before-after-injection fuel pressure differences ΔP21 and ΔP22 when an amount of change in injection time period Ti is used). At time t13, further, the fuel pressure difference ΔP22 between before and after second-stage injection is stored in the memory 56.

When injection time period Ti1 to Ti3 of each injection is relatively short, correction based on the fuel pressure Pb1 to Pb3 may not be completed. For this reason, at times t11 to t13 as injection start times, the reference fuel pressure difference ΔP1, the before-after-injection fuel pressure differences ΔP21 and ΔP22 are stored in the memory 56. At the next reference injection time period (equivalent to time t10), the injection time period Ti1 to Ti3 of each injection is computed based on the fuel pressure Pa, the reference fuel pressure difference ΔP1, and the before-after-injection fuel pressure differences ΔP21 and ΔP22. Thus, Ti correction based on fuel pressures Pb1 to Pb3 can be made by estimation even though Ti correction based on fuel pressures Pb1 to Pb3 cannot be made after start of each subsequent injection.

Figure 7:
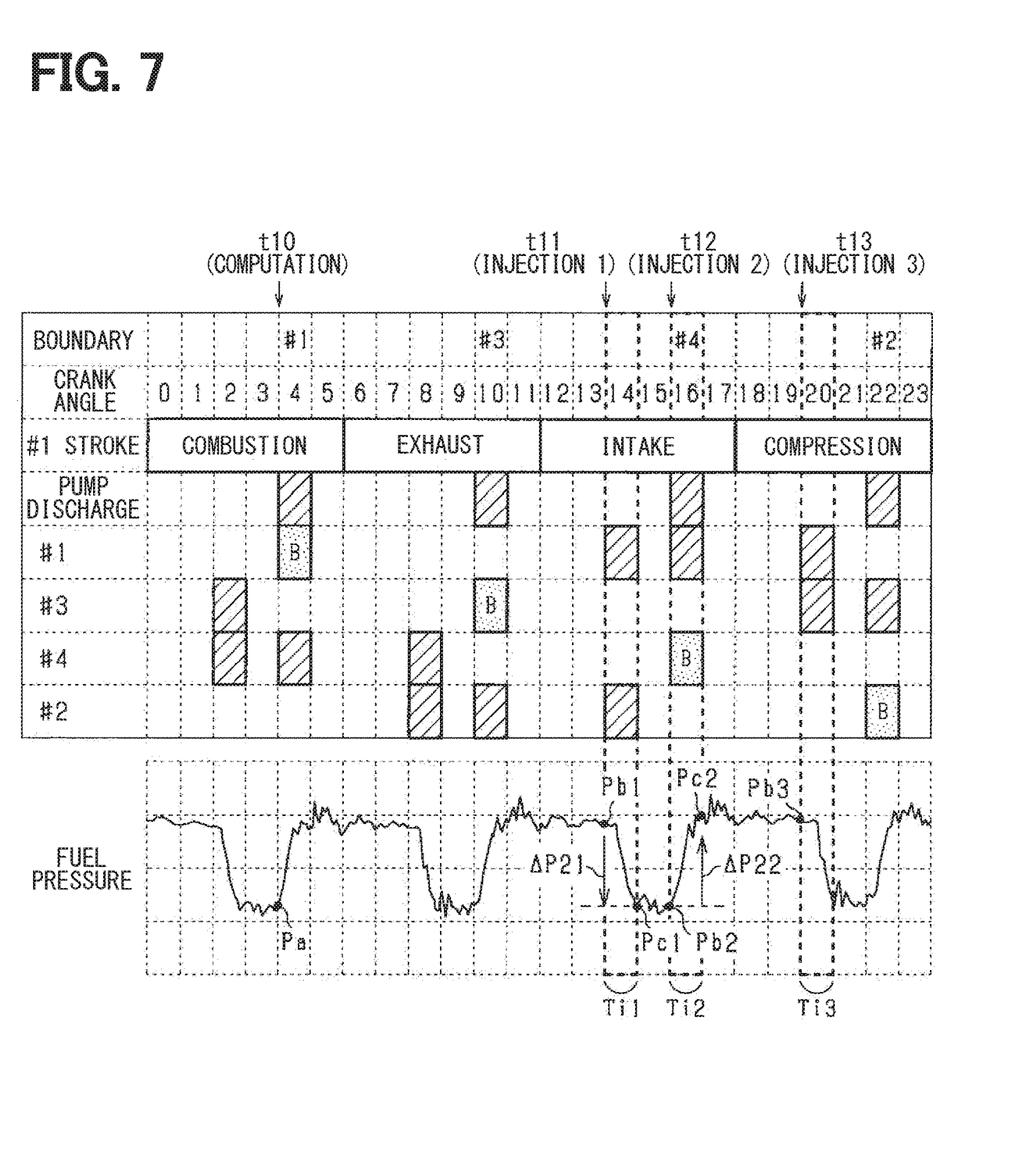
FIG. 7 is a timing chart concretely illustrating fuel injection control in the second embodiment.

Fuel pressure differences ΔP21 and ΔP22 between before and after first-stage injection and second-stage injection can also be computed by the following technique: In this case, the storage processing unit 55 computes, as the before-after-injection fuel pressure differences ΔP21 and ΔP22, differences between fuel pressures Pb1 and Pb2 acquired by the fuel pressure acquisition unit 51 at the injection start timing of each injection of split injection and fuel pressures Pc1 and Pc2 acquired by the fuel pressure acquisition unit 51 at the injection end timing and stores the computed differences. FIG. 7 illustrates an operation performed in this case.

FIG. 7 is a timing chart drawn by partly modifying FIG. 6 and the modified part is only a part related to computation of the before-after-injection fuel pressure differences ΔP21, ΔP22. Specifically, in FIG. 7, the fuel pressure is acquired respectively as Pb1 and Pc1 at start and end of first-stage injection and the fuel pressure difference ΔP21 between start and after injection is computed as a difference between the fuel pressures (ΔP21=Pc1−Pb1). The fuel pressure is acquired respectively as Pb2 and Pc2 at start and end of second-stage injection and the before-after-injection fuel pressure difference ΔP22 is computed as a difference between the fuel pressures (ΔP22=Pc2−Pb2).

In split injection in which multiple times of fuel injection are performed in one combustion cycle, fuel injection is dispersedly performed during a period from initial-stage fuel injection to last-stage fuel injection; therefore, the fuel pressure is prone to fluctuate during this period and complicated fuel pressure fluctuation may be caused to occur due to connection with fuel injection in other cylinders or the like. In this embodiment, in addition to the reference fuel pressure difference ΔP1 based on the fuel pressure Pa at the reference computation timing, the fuel pressure difference between before fuel injection and after fuel injection for each injection, that is, the before-after-injection fuel pressure difference ΔP2 is used to correct the injection time period Ti. For this reason, appropriate fuel injection can be performed even when multi-stage injection is performed.

Other Embodiments

The above-mentioned embodiments may be modified as described below:

Of the fuel injection valves 10 of the cylinders of the internal combustion engine 40, fuel injection valves 10 identical in relation of the fuel injection timing to fuel discharge of the high-pressure fuel pump 30 are identical in a tendency of fuel pressure fluctuation due to increase in fuel pressure due to fuel discharge of the high-pressure fuel pump 30 and decrease in fuel pressure due to fuel injection of the relevant fuel injection valve 10. For this reason, the reference fuel pressure difference ΔP1 computed at the time of fuel injection in a fuel injection valve 10 whose injection order comes immediately before among fuel injection valves 10 identical in relation of fuel injection period to fuel discharge can be used to compute an injection period. In this case, use of the reference fuel pressure difference ΔP1 between fuel injections in different cylinders allows the reference fuel pressure difference ΔP1 to be used with closer timing as compared with use of the reference fuel pressure difference ΔP1 between fuel injections in an identical cylinder. As a result, appropriate fuel injection can be performed regardless of transient variation in fuel pressure.

Figure 8:
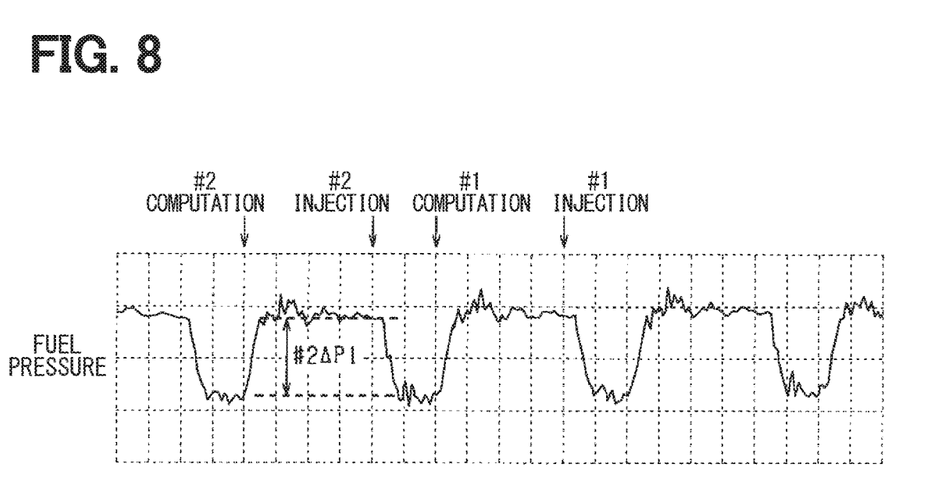

Specifically, the reference computation unit 53 uses the reference fuel pressure difference ΔP1 computed in preceding fuel injection in cylinders whose combustion order succeeds before and after to compute the injection time period Ti in subsequent fuel injection. FIG. 8 outlines this operation. In FIG. 8, at the time of fuel injection in a first cylinder, the fuel pressure Pa and the reference fuel pressure difference ΔP1 (#2ΔP1) computed for a second cylinder as the preceding cylinder are used at the reference computation timing of the first cylinder to compute the injection time period Ti of the first cylinder.

As described in relation to the above embodiments, when a cycle of fuel discharge of the high-pressure fuel pump 30 and a cycle of fuel injection of the fuel injection valve 10 in each cylinder are identical (both are 180° CA cycle), the reference fuel pressure difference ΔP1 of the preceding cylinder can be used.

However, a cycle of fuel discharge of the high-pressure fuel pump 30 and a cycle of fuel injection of the fuel injection valve 10 in each cylinder can be different from each other. For example, a cycle of fuel discharge of the high-pressure fuel pump 30 may be 360° CA cycle while a cycle of fuel injection of the fuel injection valve 10 in each cylinder may be 180° CA cycle. In this case, when combustion order is #1->#3->#4->#2, #1 and #4 fuel injection valves 10 and #3 and #2 fuel injection valves 10 are respectively fuel injection valves 10 identical in relation of fuel injection timing to fuel discharge of the high-pressure fuel pump 30. Therefore, for example, at the reference computation timing for #1, the reference computation unit 53 uses the reference fuel pressure difference ΔP1 immediately before at #4 to compute the injection time period Ti.

Figure 9:
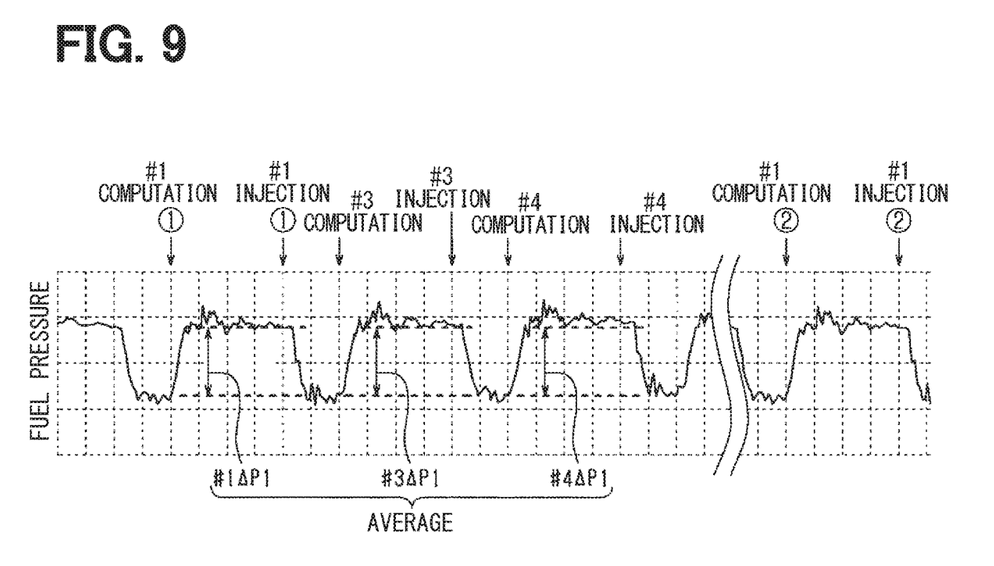

When the reference fuel pressure difference ΔP1 at a fuel injection valve 10 whose injection order comes immediately before among fuel injection valves 10 identical in relation of the fuel injection timing to fuel discharge of the high-pressure fuel pump 30 is used, the reference computation unit 53 may use reference fuel pressure differences ΔP1 equivalent to past n (n>2) times including the preceding reference fuel pressure difference ΔP1 to compute the injection time period Ti. FIG. 9 outlines this operation. In FIG. 9, for example, an average value of reference fuel pressure differences ΔP1 equivalent to n times is computed and the average value is used to compute the injection time period Ti.

A fuel injection control device according to the present disclosure is applicable to a diesel engine as well as a gasoline engine. That is, the present disclosure is applicable to a fuel injection control device that controls a fuel injection valve of a direct injection type diesel engine.

The present disclosure is described based on embodiments but the present disclosure should not be understood to be limited to the above-mentioned embodiments or structures. The present disclosure includes various modifications and modifications within an equivalent scope. In addition, various combinations and modes and other combinations and modes including only one element, not less than one element, or not more than one element are also included in a category or a scope of idea of the present disclosure.

What is claimed is:

1. A fuel injection control device for a fuel injection system, which includes an accumulation container configured to accumulate high-pressure fuel, a fuel pump configured to pressure-feed fuel to the accumulation container, a fuel injection valve configured to inject high-pressure fuel accumulated in the accumulation container into a cylinder of an internal combustion engine, and a fuel pressure sensor configured to detect a fuel pressure in the accumulation container, the fuel injection control device comprising:
a fuel pressure acquisition unit configured to acquire the fuel pressure detected with the fuel pressure sensor; and
an injection control unit configured to control fuel injection with the fuel injection valve, wherein
the injection control unit includes:
a reference computation unit configured
to compute a required injection quantity and an injection start timing based on an operation state of the internal combustion engine at a predetermined reference computation timing, which is set for each combustion cycle of the internal combustion engine and
further to compute an injection time period based on the fuel pressure detected by the pressure sensor and acquired by the fuel pressure acquisition unit at the reference computation timing of a present combustion cycle;
a correction unit configured to correct the injection time period based on the fuel pressure detected by the pressure sensor and acquired by the fuel pressure acquisition unit at the injection start timing of the present combustion cycle, such that the injection time period is shortened, as the fuel pressure acquired by the fuel pressure acquisition unit at the injection start timing becomes higher than the fuel pressure acquired by the fuel pressure acquisition unit at the reference computation timing; and
a storage processing unit configured
to compute, as a reference fuel pressure difference, a difference between the fuel pressure acquired by the fuel pressure acquisition unit at the reference computation timing and the fuel pressure acquired by the fuel pressure acquisition unit at the injection start timing and
to store the reference fuel pressure difference in a storage unit, wherein
the reference computation unit is configured to compute the injection time period based on the fuel pressure acquired by the fuel pressure acquisition unit at the reference computation timing and the reference fuel pressure difference computed at a preceding combustion cycle or before and stored in the storage unit,
the correction unit is configured
to correct the injection time period, which is computed at the reference computation timing, based on the fuel pressure detected by the pressure sensor and acquired by the fuel pressure acquisition unit at the injection start timing of the present combustion cycle in a case where correction of the injection time period is to be completed in the injection time period computed at the reference computation timing and not to correct the injection time period computed by the reference computation unit in a case where correction of the injection time period is not to be completed in the injection time period computed at the reference computation timing.

2. The fuel injection control device according to claim 1, wherein the reference computation unit is configured to use, as the reference fuel pressure difference to be stored in the storage unit, a reference fuel pressure difference computed in a preceding combustion cycle of an identical fuel injection valve to compute the injection time period.

3. The fuel injection control device according to claim 1, wherein in the fuel injection system, the internal combustion engine is a multi-cylinder internal combustion engine, and the fuel injection valve is of a plurality of fuel injection valves for respective cylinders configured to inject fuel in predetermined order, wherein the fuel injection valves of respective cylinders include fuel injection valves which are identical to each other in relation of fuel injection timing to fuel discharge of the fuel pump, and the reference computation unit is configured to use, to compute the injection time period of the fuel injection valve, the reference fuel pressure difference computed at a time of fuel injection with one of the fuel injection valves, an injection order of which comes immediately before the fuel injection valve, and which is identical in relation of the fuel injection timing to the fuel discharge of the fuel injection valve.

4. The fuel injection control device according to claim 1, wherein the injection control unit is configured to perform multiple times of fuel injection as split injection in one combustion cycle of the internal combustion engine, the storage processing unit is configured to compute, as a before-after-injection fuel pressure difference, a fuel pressure difference between before fuel injection and after fuel injection for each injection in the split injection and to store the before-after-injection fuel pressure difference in the storage unit, and the reference computation unit is configured to compute the injection time period based on the fuel pressure acquired by the fuel pressure acquisition unit at the reference computation timing, the reference fuel pressure difference, and the before-after-injection fuel pressure difference stored in the storage unit.

5. The fuel injection control device according to claim 4, wherein the storage processing unit is configured to compute for each injection, as the before-after-injection fuel pressure difference, a difference between the fuel pressure acquired by the fuel pressure acquisition unit at the injection start timing of injection in the split injection and the fuel pressure acquired by the fuel pressure acquisition unit at the injection start timing of a subsequent injection and to store the difference.

6. The fuel injection control device according to claim 4, wherein the storage processing unit is configured to compute for each injection, as the before-after-injection fuel pressure difference, a difference between the fuel pressure acquired by the fuel pressure acquisition unit at the injection start timing of injection in the split injection and the fuel pressure acquired by the fuel pressure acquisition unit at an injection end timing of the injection and to store the difference.

7. A method implemented by a computer for controlling a fuel injection valve, comprising:

acquiring a fuel pressure with a pressure sensor in an accumulation container that is configured to accumulate high-pressure fuel, the high-pressure fuel being pressure-fed from a fuel pump and to be injected with the fuel injection valve into a cylinder of an internal combustion engine;

computing a required injection quantity and an injection start timing for the fuel injection valve based on an operation state of the internal combustion engine at a predetermined reference computation timing, which is set for each combustion cycle of the internal combustion engine;

computing, as a reference fuel pressure difference, a difference between the fuel pressure acquired at the reference computation timing and the fuel pressure acquired at the injection start timing;

storing the reference fuel pressure difference;

computing an injection time period based on the fuel pressure acquired at the reference computation timing of a present combustion cycle and the reference fuel pressure difference computed and stored at a preceding combustion cycle or before;

correcting the injection time period, which is computed at the reference computation timing, based on the fuel pressure detected at the injection start timing of the present combustion cycle, such that the injection time period is shortened, as the fuel pressure acquired at the injection start timing becomes higher than the fuel pressure acquired at the reference computation timing, in a case where correction of the injection time period is to be completed in the injection time period computed at the reference computation timing; and prohibiting the correcting in a case where correction of the injection time period is not to be completed in the injection time period computed at the reference computation timing.

8. The fuel injection control device according to claim 1, wherein the correction unit is configured to correct the injection time period in a partial lift region in which partial lift injection is performed to inject fuel with a valve body that does not arrive at a maximum lift amount in the fuel injection valve.

9. The fuel injection control device according to claim 1, wherein the case where correction of the injection time period is not to be completed is determined when the injection time period is smaller than a predetermined value.

10. The method according to claim 7, wherein the case where correction of the injection time period is not to be completed is determined when the injection time period is smaller than a predetermined value.

* * * * *